(12) United States Patent
Sakamoto

(10) Patent No.: US 8,719,405 B2
(45) Date of Patent: May 6, 2014

(54) MANAGEMENT APPARATUS, MANAGEMENT APPARATUS CONTROL METHOD, AND STORAGE MEDIUM

(75) Inventor: Koji Sakamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 224 days.

(21) Appl. No.: 13/252,472

(22) Filed: Oct. 4, 2011

(65) Prior Publication Data

US 2012/0096147 A1  Apr. 19, 2012

(30) Foreign Application Priority Data

Oct. 18, 2010  (JP) ................................. 2010-233684

(51) Int. Cl.
*G06F 15/173*  (2006.01)
(52) U.S. Cl.
USPC ............ 709/224; 709/223; 709/225; 709/226
(58) Field of Classification Search
None
See application file for complete search history.

(56) References Cited

U.S. PATENT DOCUMENTS

| 2005/0228688 | A1* | 10/2005 | Visser et al. ...................... 705/1 |
| 2008/0096529 | A1* | 4/2008 | Zellner .......................... 455/411 |
| 2009/0193450 | A1* | 7/2009 | Kellerman ...................... 725/25 |
| 2011/0004914 | A1* | 1/2011 | Ennis et al. ...................... 726/1 |

FOREIGN PATENT DOCUMENTS

JP  2010-066974 A  3/2010

* cited by examiner

*Primary Examiner* — Brian P Whipple
(74) *Attorney, Agent, or Firm* — Canon USA, Inc. IP Division

(57) ABSTRACT

An apparatus includes a storage device configured to store a map image of one or more floors on which a network device is installed, positional information about an installation location of the network device on the map image, and configuration information about the network device, a setting unit configured to set a region on the map image and a rule that the network device complies with in the region, a moving unit configured to designate a movement destination for moving the network device by changing the positional information, a determination unit configured, if the positional information has been changed, to determine a content of a change of a configuration required to be executed to the network device when the network device is moved, and a notification unit configured to notify to an operator the content of the change of the configuration.

16 Claims, 14 Drawing Sheets

MANAGEMENT APPARATUS, MANAGEMENT APPARATUS CONTROL METHOD, AND STORAGE MEDIUM

BACKGROUND OF THE INVENTION

1. Field of the Invention

The present invention relates to a management apparatus configured to manage one or more network devices.

2. Description of the Related Art

In order to apply a security rule to a plurality of network devices, a conventional method sets a group to which they belong for network devices. For example, a conventional method discussed in Japanese Patent Application Laid-Open No. 2010-66974 registers a plurality of network devices as a group according to positional information. Furthermore, the conventional method applies a security rule differently to each group. In the above-described manner, the method discussed in Japanese Patent Application Laid-Open No. 2010-66974 applies the security rule to a plurality of network devices.

For a network device, an application program (hereinafter simply referred to as an "application") to be installed or not to be installed may be determined according to its installation location. For example, in a location to which a non-authorized person can access, it is desired that an application configured to monitor the utilization status of the network device be installed.

In addition, for a network device, a user who can or cannot utilize the network device may be determined according to the installation location of the network device. In a conventional system, an information technology (IT) administrator is required to verify whether each network device is located in a security application region and to execute an optimum setting to each network device.

More specifically, in a conventional system, the IT administrator is required to bear the enormous burden of having to determine whether each network device complies with the security policy of an area to which each network device has moved every time the installation location of each network device has been changed or every time an application has been installed to or uninstalled from each network device and having to execute necessary operations.

SUMMARY OF THE INVENTION

According to an aspect of the present invention, an apparatus configured to manage a network device includes a storage device configured to store a map image of one or more floors on which the network device is installed, positional information about an installation location of the network device on the map image, and configuration information about the network device, a setting unit configured to set a region on the map image and a rule that the network device complies with in the region, a moving unit configured to designate a movement destination for moving the network device by changing the positional information, a determination unit configured, if the positional information has been changed, to determine a content of a change of a configuration required to be executed to the network device when the network device is moved, by comparing the configuration information whose positional information has been changed and the rule in which the changed positional information belongs, and a notification unit configured to notify the content of the change of the configuration.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to describe the principles of the invention.

DESCRIPTION OF THE EMBODIMENTS

Various exemplary embodiments, features, and aspects of the invention will be described in detail below with reference to the drawings.

Figure 1:
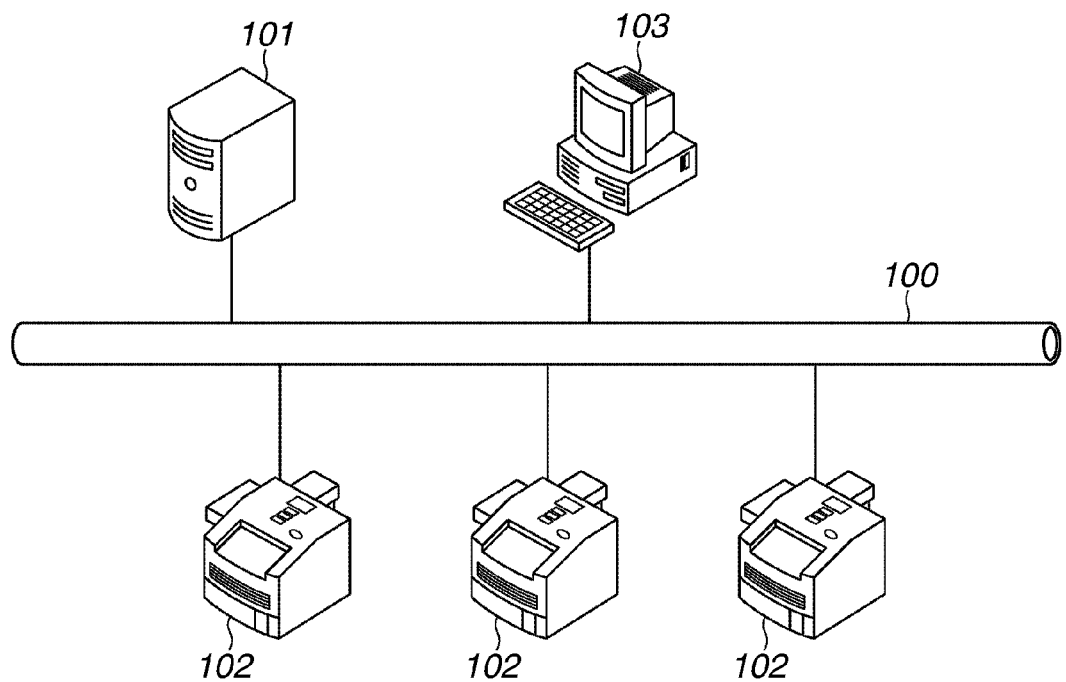
FIG. 1 illustrates an example configuration of the entire network device management system according to an exemplary embodiment of the present invention.

FIG. 1 illustrates an example configuration of the entire network device management system according to a first exemplary embodiment of the present invention. Referring to FIG. 1, a network device management system according to the present exemplary embodiment includes a network device management apparatus 101, a network device 102, and a client apparatus 103, which are in communication with one another via a network 100.

The client apparatus 103 is a general personal computer (PC), which has a browser function. The network device 102 is a network-connected apparatus, such as a multifunction peripheral (MFP), a printer, a facsimile apparatus, or a scanner. The network device 102 can be managed by the network device management apparatus 101 via the network 100.

Figure 2:
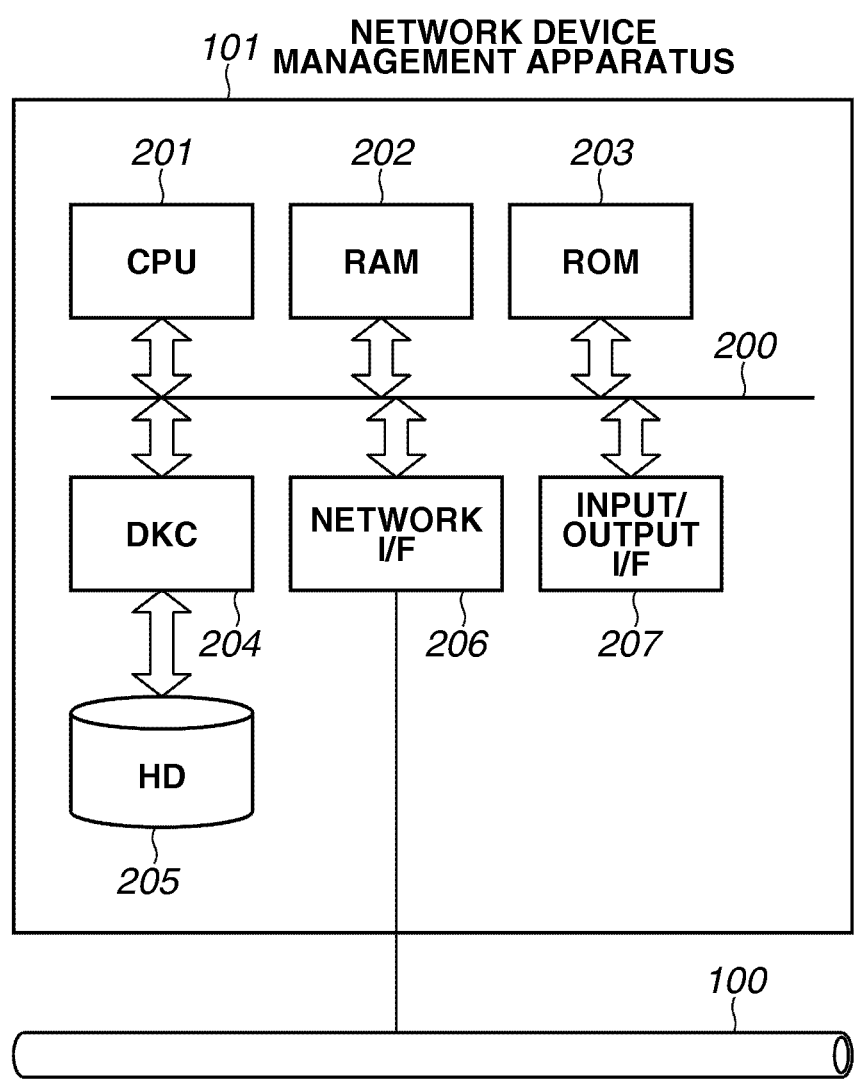
FIG. 2 is a block diagram illustrating an example hardware configuration of a network device management apparatus 101.

FIG. 2 is a block diagram illustrating an example hardware configuration of the network device management apparatus 101. The hardware configuration illustrated in FIG. 2 is a configuration of a general purpose computer, which the client apparatus 103 also employs.

Referring to FIG. 2, the system bus 200 is a common data communication path between components included in the computer. A central processing unit (CPU) 201 is a device (processor) configured to control an operation of the entire computer and execute a calculation operation.

A random access memory (RAM) 202 is a region configured to store a program and data necessary for processing executed by the CPU 201. A read-only memory (ROM) 203 is a region for storing a program, such as a system boot program.

A disk controller (DKC) 204 controls an external storage device, such as a hard disk (HD) 205. The HD 205 stores a program and data. The program and the data are loaded from the HD 205 onto the RAM 202 when necessary. A network interface (I/F) 206 is connected with the network 100. By using the network I/F 206, the computer can execute a network communication. An input/output (I/O) I/F 207 is connected to input and output devices, such as a keyboard (not illustrated), a mouse (not illustrated), and a display (not illustrated), and is configured to input and output data.

The network device management apparatus 101 operates when the CPU 201 executes a basic I/O program and an operating system (OS). The basic I/O program, which is a computer-executable program, is previously recorded on the ROM 203. The OS (a computer-executable program), is previously recorded on the HD 205.

When the network device management apparatus 101 is powered on, the OS is loaded from the HD 205 onto the RAM 202 by an initialization program loading function included in the basic I/O program. In the above-described manner, the OS starts its operation.

Figure 3:
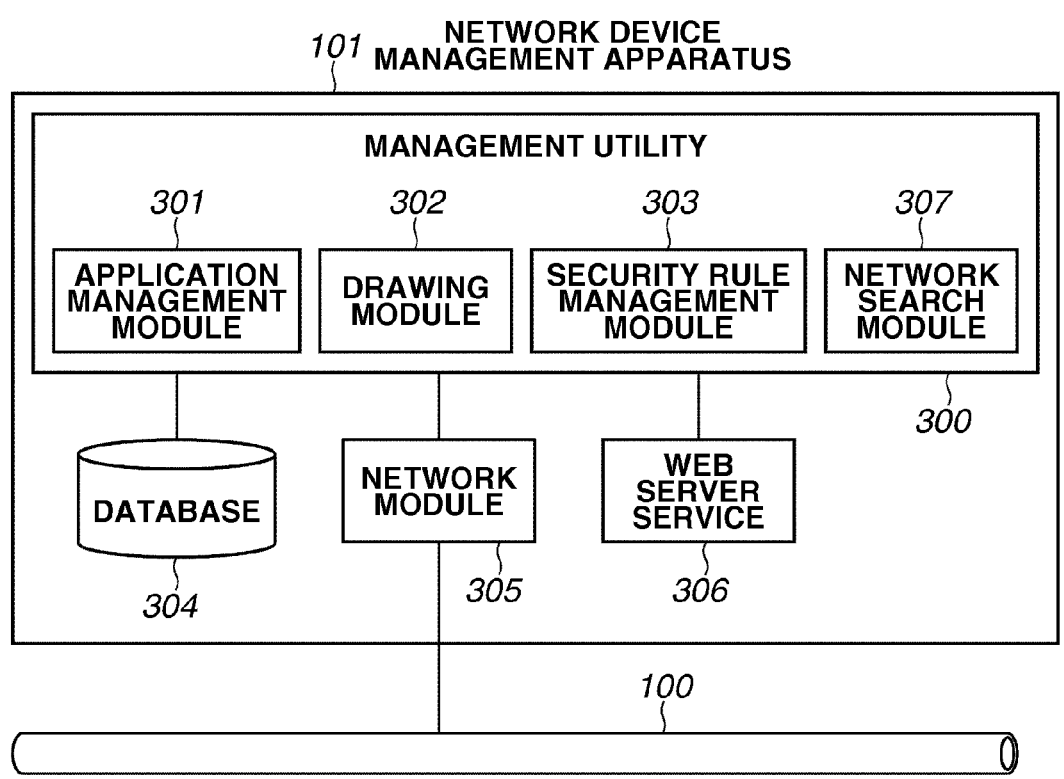
FIG. 3 is a block diagram illustrating an example software configuration of the network device management apparatus 101.

FIG. 3 is a block diagram illustrating an example software configuration of the network device management apparatus 101.

Referring to FIG. 3, as its software components, the network device management apparatus 101 includes a management utility 300, a database 304, a network module 305, and a web server service 306.

The software configuration illustrated in FIG. 3 is stored on the HD 205 (FIG. 2) as a program, and is executed by the CPU 201 (FIG. 2).

The management utility 300 includes an application management module 301, a drawing module 302, and a security rule management module 303, and a network search module 307.

The application management module 301 is configured to request the network module 305 to transmit to the network device 102 a file of an application to be installed on the network device 102.

The file to be transmitted according to the request by the application management module 301 includes all files necessary for installing an application, such as an execution module or a setting file, to the network device 102 and information that requests the installation of the application.

In addition, the application management module 301 is configured to request the network module 305 to transmit to the network device 102 information that requests the uninstallation of an application from the network device 102.

In addition, the application management module 301 is configured to register the information about the application installed to or uninstalled from the network device 102 to the database 304. In other words, the application management module 301 is configured to register configuration information about the network device 102 to the database 304.

The drawing module 302 is a module configured to draw a map image that expresses the installation location of the network device 102 illustrated in FIGS. 7 and 9, which will be described in detail below.

To the database 304, a map image of one or more floors (the plurality of floors can be floors of different buildings or sites) on which the network device 102 is installed and positional information (coordinates) on the map image corresponding to the installation location of the network device 102.

The registration of the information is executed from the application management module 301. However, the information can be registered from another registration source. The drawing module 302 draws the above-described map image (the map image illustrated in FIGS. 7 and 9) by using the map image and the positional information about the network device 102.

In the present exemplary embodiment, it is supposed that the drawing module 302, which is a web application, has a display screen generation function for drawing (generating) a display screen configured to display the map image. However, the drawing module 302 is not limited to a web application. More specifically, the drawing module 302 can generate a display screen for displaying a display screen on a native application.

The security rule management module 303 is configured to manage a security rule application range, which is designated by a user. The security rule application range includes a shape, a location, and a size of a range (region) to which the security rule is to be applied.

In addition, the security rule management module 303 is configured to manage information about the application to be installed or not to be installed to the network device 102 installed within the security rule application range designated by the user.

The security rule management module 303 is configured to receive the security rule application range and a designation (a setting) of a rule which the network device 102 should comply with in the above-described security rule application range. In addition, the security rule management module 303 mutually associates the security rule application range and the designation of the rule that the network device 102 should comply with and registers the mutually associated information to the database 304.

Furthermore, the application management module 301 is configured to register coordinates of the movement destination of the network device 102, and a schedule of a task (a task schedule) for executing an operation for changing the configuration (i.e., issue a configuration change request) of the network device 102, which will be described in detail below, to the database 304.

The network search module 307 is configured to search for a network device 102 and a client apparatus 103, which are network-connected apparatuses, by using the network module 305.

In addition, the network search module 307 is configured to acquire setting information (a media access control (MAC) address and configuration information) from a search target apparatus, and transfer the extracted information to the application management module 301. Furthermore, the application management module 301 is configured to register the received information to the database 304.

The database 304 is configured to manage the data. The data is registered to and loaded from the database 304 according to a request from other modules. The data managed by the database 304 includes information about the application installed to the network device 102, a map image of one or more floors on which the network device 102 is installed, the coordinates of the network device 102 (i.e., positional information about the network device 102 on the map image), and schedule information about the operation for changing the configuration of the network device 102. In addition, the database 304 can be installed on any apparatus different from the network device management apparatus 101 if an access to the database 304 from the management utility 300 is available.

The network module 305 is configured to communicate with the network device 102 and the client apparatus 103, which are connected to the network via the network 100. When a GET request by a hypertext transport protocol (HTTP) is received from a web browser of the client apparatus 103, which the user operates, the web server service 306 transmits web page data stored on the HD 205.

The web browser of the client apparatus 103 can externally access the network device management apparatus 101 via the network 100 by using the web server service 306.

The network device management apparatus 101 functions as a management apparatus by executing the management utility 300, which is installed on the web server service 306. The management utility 300 is implemented as a program configured to execute processing in response to a request input via a web page provided by the web server service 306. As described above, the management utility 300 implements a web application configured to manage the network device 102 together with the web server service 306.

Figure 4:
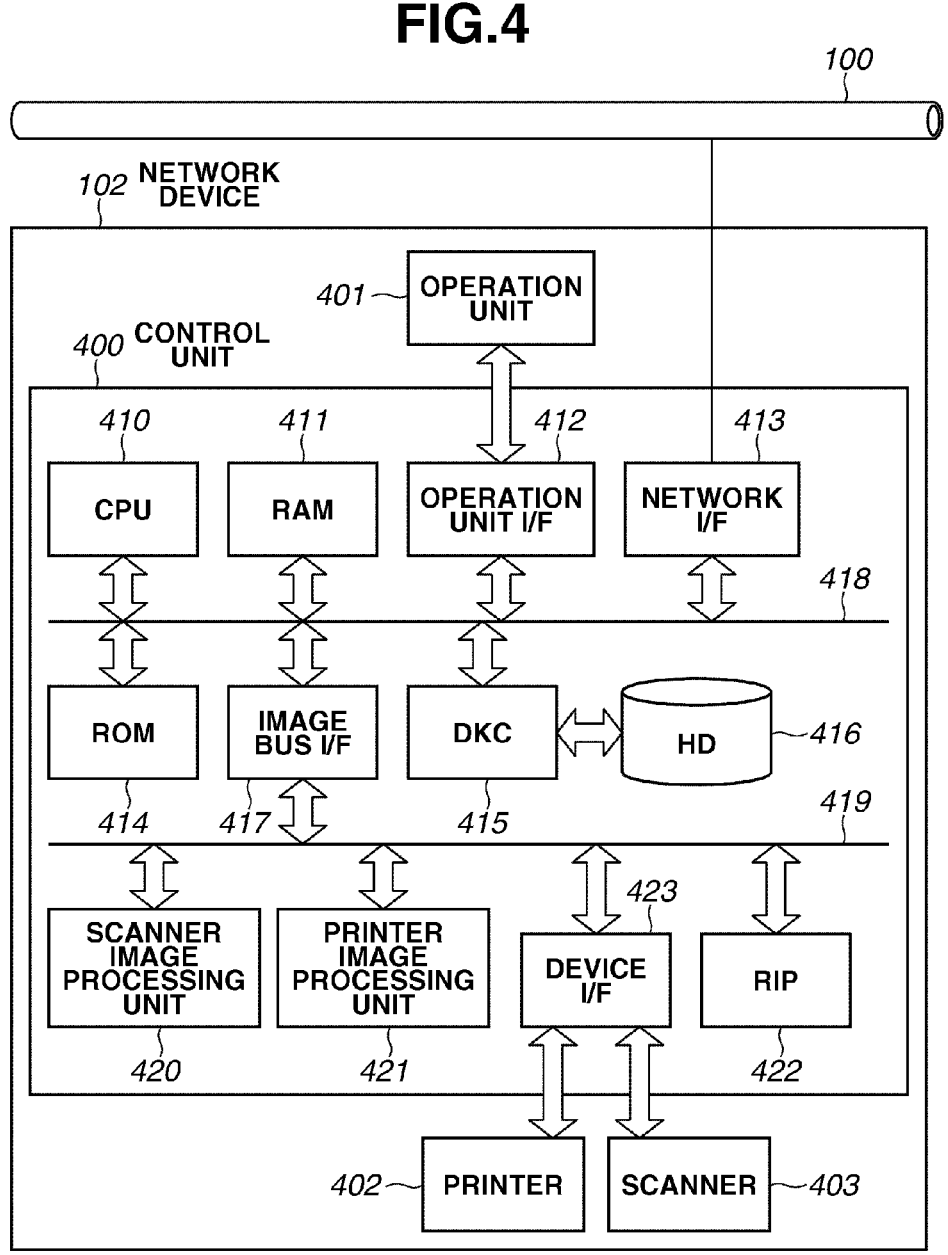
FIG. 4 is a block diagram illustrating an example hardware configuration of a network device 102.

FIG. 4 illustrates an example hardware configuration of the network device 102. Referring to FIG. 4, the network device 102 includes a control unit 400, an operation unit 401, a printer 402, and a scanner 403.

The operation unit 401 includes a display unit and operation keys, via which an operation can be input by the user. The operation unit 401 may function as a touch panel, which can function as a display unit and an operation unit at the same time.

The control unit 400 includes a CPU 410, a RAM 411, a operation unit I/F 412, a network I/F 413, a ROM 414, a DKC 415, a HD 416, an image bus I/F 417, and a system bus 418.

As components related to printing and scanning, the control unit 400 includes an image bus 419, a scanner image processing unit 420, a printer image processing unit 421, a raster image processor (RIP) 422, and a device I/F 423. Among the components of the control unit 400 described above, the scanner 403 and the scanner image processing unit 420 are not always required.

The CPU 410 is a controller configured to control the entire control unit. The RAM. 411 is an image memory configured to temporarily store image data.

The operation unit I/F 412 is an interface with the operation unit 401. In addition, the operation unit I/F 412 is configured to output to the operation unit 401 image data to be displayed on the operation unit 401. Furthermore, the operation unit I/F 412 is configured to transmit information input by the user via the operation unit 401 to the CPU 410.

The network I/F 413 is connected with the network 100. In other words, the network I/F 413 is an interface for data communication with the network 100. In addition, the network I/F 413 is configured to manage a management information base (MIB), which stores various information about the network device 102.

Various information stored on the MIB includes information, such as an Internet protocol (IP) address or the name of each network device. The information is stored on the network I/F 413, the RAM 411, or the ROM 414.

The ROM 414 is a boot ROM that stores a system boot program. The DKC 415 controls the HD 416. The HD 416 is an external storage device that stores system software and image data. The image bus I/F 417 is a bus bridge between the system bus 418 and the image bus 419, and is configured to execute data conversion.

The system bus 418 is a common data communication path among components included in the control unit. The image bus 419 is constituted by a peripheral component interconnect (PCI) bus or Institute of Electrical and Electronic Engineers (IEEE) 1394. The image bus 419 is a path for transmitting image data at a high speed.

The scanner image processing unit 420 is configured to execute image correction, image processing, and image editing on an input image. The printer image processing unit 421 is configured to execute correction and resolution conversion on printed output data according to the performance of the printer.

The RIP 422 is configured to rasterize a page description language (PDL) command transmitted via the network 100 into a bitmap image. The device I/F 423 is an interface between image input/output devices, such as the printer 402 and the scanner 403, and the control unit 400. In addition, the device I/F 423 executes a synchronous/asynchronous conversion on the image data.

Figure 5:
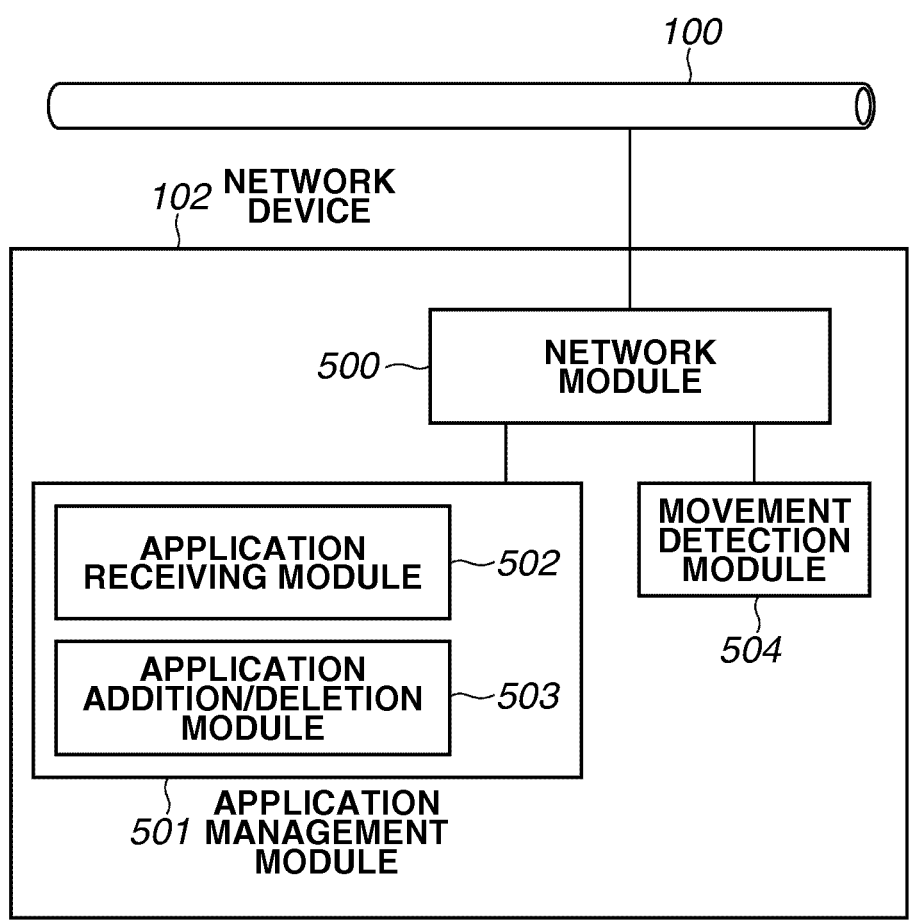
FIG. 5 is a block diagram illustrating an example software configuration of the network device 102.

FIG. 5 is a block diagram illustrating an example software configuration of the network device 102. Referring to FIG. 5, as the software configuration, the network device 102 includes a network module 500, an application management module 501, and a movement detection module 504.

The software configuration illustrated in FIG. 5 is stored on the ROM 414 or the HD 416 (FIG. 4) as a program, and is executed by the CPU 410 (FIG. 4).

The network module 500 is configured to communicate with the network device management apparatus 101 via the network 100. The application management module 501 is configured to manage an application installed on the network device 102.

The application management module 501 includes an application receiving module 502 and an application addition/deletion module 503. The application installed on the network device 102 includes a preinstalled application, which is an application preinstalled on the network device 102, and an application additionally installed on the network device 102.

The application receiving module 502 is configured to receive a file of an application to be installed, which has been transmitted from the network device management apparatus 101 via the network 100. In addition, the application receiving module 502 is configured to receive a request for uninstalling the installed application. Furthermore, the application receiving module 502 is configured to request the installation or the uninstallation of the application to the application addition/deletion module 503.

The application addition/deletion module 503 is configured to install or uninstall the application according to the request received by the application management module 501 from the network device management apparatus 101.

The application management module 501 transmits setting information to the network device management apparatus 101 according to a request for acquiring setting information (i.e., a MAC address or configuration information) that has been transmitted from the network device management apparatus 101. The configuration information includes information about the application installed to the network device 102 and information about the user who has been authorized to utilize the network device 102.

If the network device 102 has been moved, the movement detection module 504 detects that the network device 102 has moved. In addition, the network device 102 is configured to notify the network device management apparatus 101 that the network device 102 has moved.

As will be described below in a second exemplary embodiment of the present invention, the movement detection module 504 detects the movement of the network device 102 by using a conventional method, such as a global positioning system (GPS) or by a method in which the user presses a specific button on the operation unit 401 when the network device 102 is moved.

Figure 6:
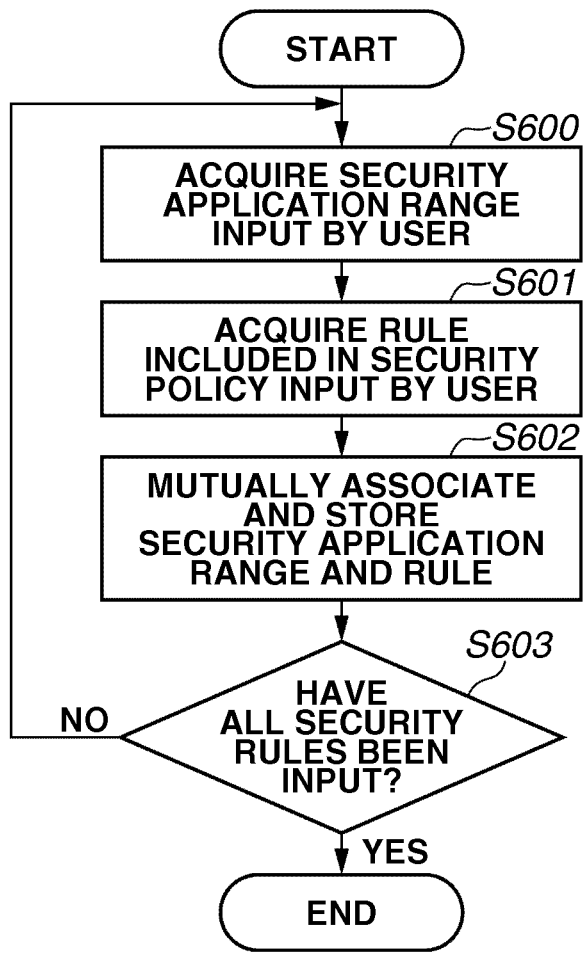
FIG. 6 is a flow chart illustrating an example flow of processing for registering a security rule that the network device 102 should comply with, and a security rule application region.

FIG. 6 is a flow chart illustrating an example flow of processing for registering a security rule that the network device 102 should comply with and a security rule application region (i.e., a security rule application range).

Processing illustrated in FIG. 6 is executed mainly by the security rule management module 303 included in the network device management apparatus 101. In other words, each step of the flow chart of FIG. 6 is implemented by the CPU 201 by loading and executing a computer-executable program from the HD 205.

Figure 7:
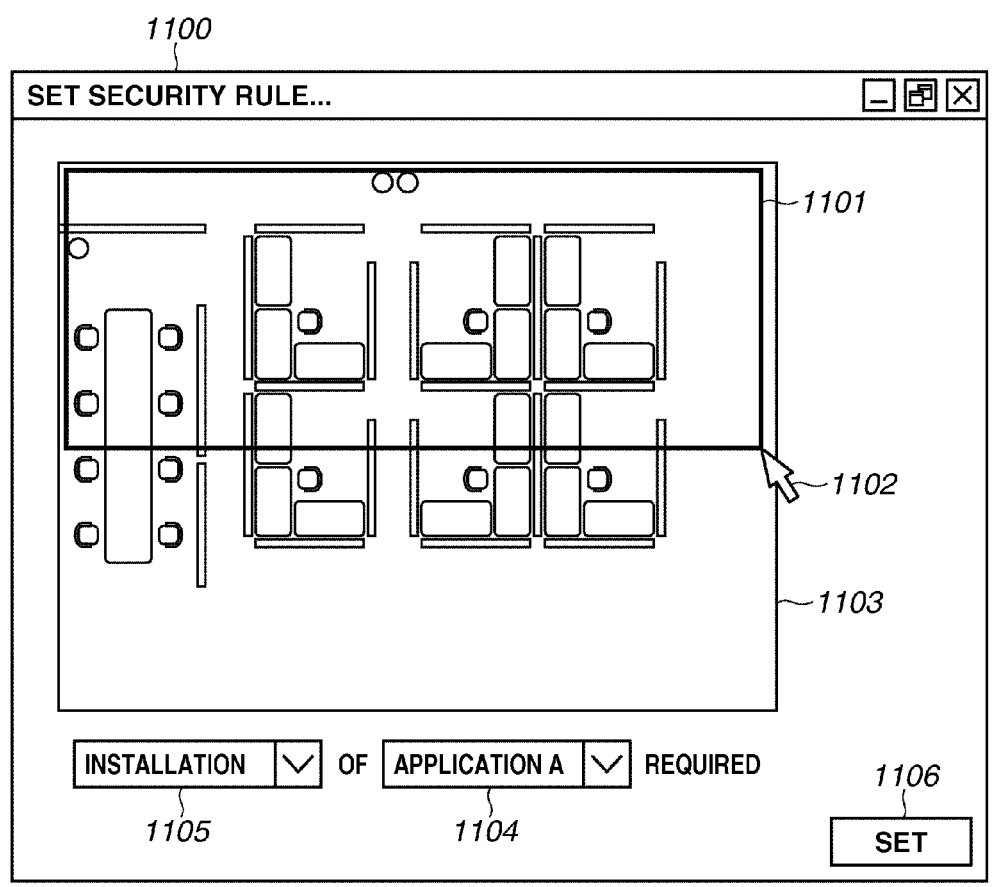
FIG. 7 illustrates an example security rule setting window, which is a user interface (UI) for designating a security application region and a security rule.

When the user instructs the start of setting of a security rule via the web browser included in the client apparatus 103 which the user operates, the web server service 306 displays a security rule setting window 1100 illustrated in FIG. 7 on the web browser. The security rule setting window 1100 will be described in detail below.

FIG. 7 illustrates an example security rule setting window, which is a UI for designating (setting) a security application region and a security rule.

Referring to FIG. 7, the security rule setting window 1100 includes a security application range selection tool 1101. By using an input cursor 1102, the user can designate the shape, the location, and the size for applying the security rule as a security application range (region) within the range of a map area 1103. The map area 1103 is drawn by the drawing module 302.

The security application range designation method is not limited to the above-described method. In other words, any other method configured to designate a range (region) on a map image, which expresses a floor, on which a network device is installed and which is drawn by the drawing module 302, can be used. For example, a method for drawing a rectangle by the user on a drawn map image can be used. The above-described map image will also be hereinafter referred to as a "device map".

The user can select the name of an application via an application designation box 1104 to set a target application. In addition, the user can set whether the application is to be installed or to be uninstalled via an installation/uninstallation designation box 1105. To paraphrase this, the user sets a rule of a security policy via the boxes 1104 and 1105.

After setting the security application range and the rule of the security policy, the user presses a "set" button 1106. After that, processing in steps S601 through S603 illustrated in FIG. 6 is executed by the security rule management module 303. In addition, the security application range and the rule of the security policy are registered to the database 304.

The user can input a designation by using a mouse, which is connected to the I/O I/F 207 of the client apparatus 103, which the user operates. The processing in each step of the flow chart of FIG. 6 will be described in detail below.

Referring to FIG. 6, in step S600, the security rule management module 303 acquires the security application range input (set) by the user.

In step S601, the security rule management module 303 acquires the security policy rules 1104 and 1105 input (set) by the user. The security rule will be described in detail below.

In step S602, the security rule management module 303 mutually associates the security rule application range acquired in step S600 and the security policy rule acquired in step S601, and registers the mutually associated range and rule to the database 304.

In step S603, the security rule management module 303 determines whether the user has expressed that the user has completed the input of the security rule. For example, if the user has performed instruction to discontinue the display of the security rule setting window 1100, the security rule management module 303 determines that the security rule has been completely input by the user.

On the other hand, if it is determined that the user has not completed the input of the security rule (NO in step S603), then the processing returns to step S600. In step S600, the security rule management module 303 receives the setting of another security rule.

By repeatedly executing the above-described processing, the present exemplary embodiment can set a plurality of security policy rules to one security application range. Alternatively, a UI for setting the same security policy rule to a plurality of security application range together can be provided.

If it is determined that the user has input information indicating the completion of the input of the security rule (YES in step S603), then the security rule management module 303 ends the processing for registering the security rule and the security rule application range.

As described above, in the present exemplary embodiment, the security rule setting window 1100 is displayed on the web browser included in the client apparatus 103, which the user operates. Furthermore, the user inputs the security rule via the web browser. However, alternatively, the security rule setting window 1100 can be displayed on a display of the network device management apparatus 101. In this case, the user can input a security rule by using a mouse of the network device management apparatus 101.

The security rule will be described in detail below. The security rule is a definition of rules that the network device 102 should comply with, which is set to the application range. The security rule is registered by the security rule management module 303 of the network device management apparatus 101 to the database 304. In the following description, it is supposed that the network device 102 is an MFP.

If an MFP is installed in a region to which a person other than persons concerned to the company may access, it may become necessary to install an application to the MFP, which may not be required to be installed to another MFP installed in a region to which only persons concerned to the company may access.

The above-described application includes an application for monitoring a print product or a scanned document, which is configured to store and manage mutually associated user information and a content log (history information about an output image).

If the above-described application is to be installed, the security rule can be defined as "the application is to be installed to a network device located within the range". In the present invention, the security rule defines a region designated by the user and a rule that the network device should comply with in the region designated by the user.

Figure 8:
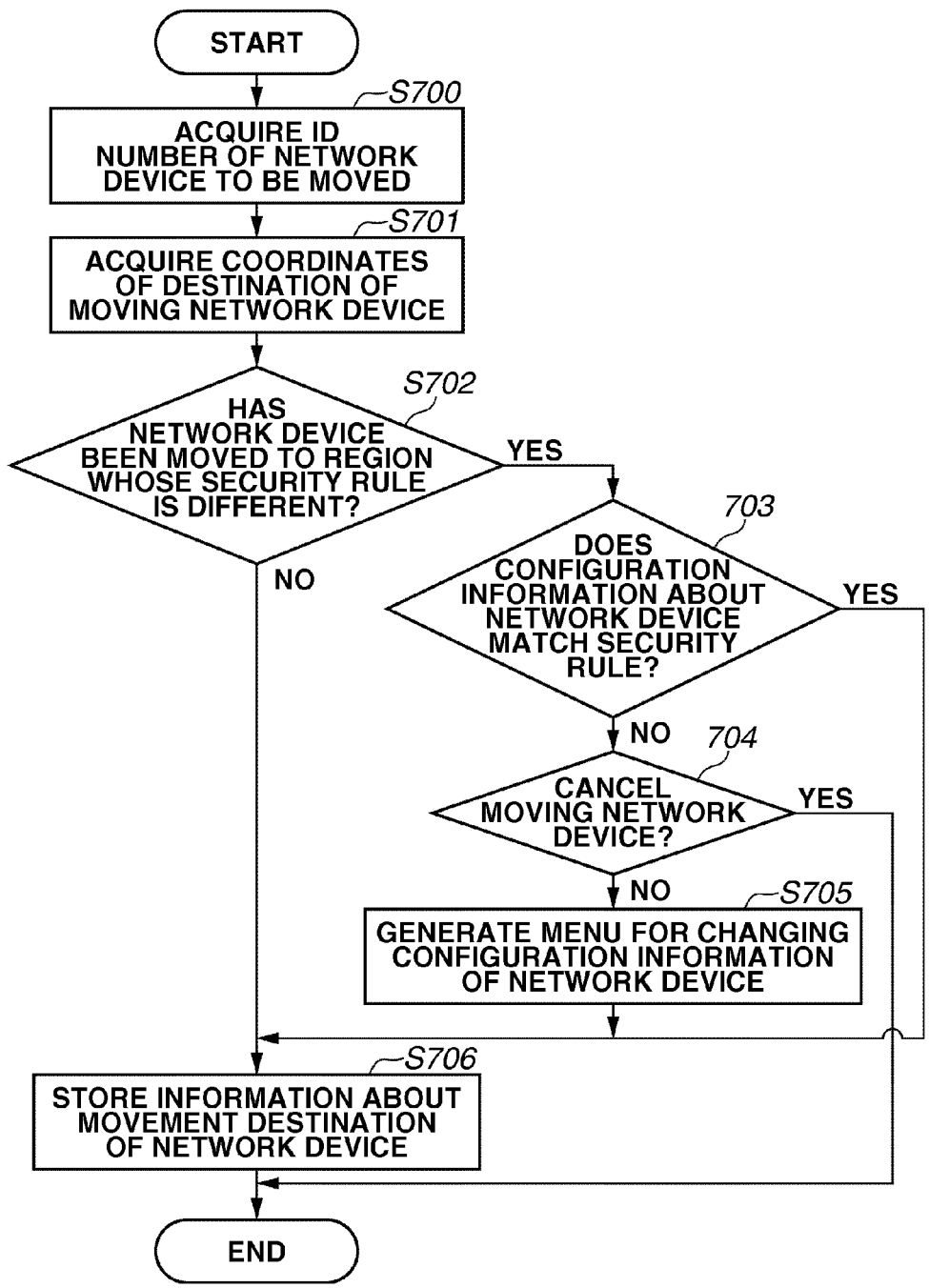
FIG. 8 is a flow chart illustrating an example flow of processing for determining whether an application installed to each network device 102 complies with the security rule.

FIG. 8 is a flow chart illustrating an example flow of processing for determining whether an application installed to each network device 102 complies with the security rule.

Processing illustrated in FIG. 8 is executed by the application management module 301 included in the network device management apparatus 101. In other words, each step of the flow chart of FIG. 6 is implemented by the CPU 201 by loading and executing a computer-executable program from the HD 205.

Figure 9:
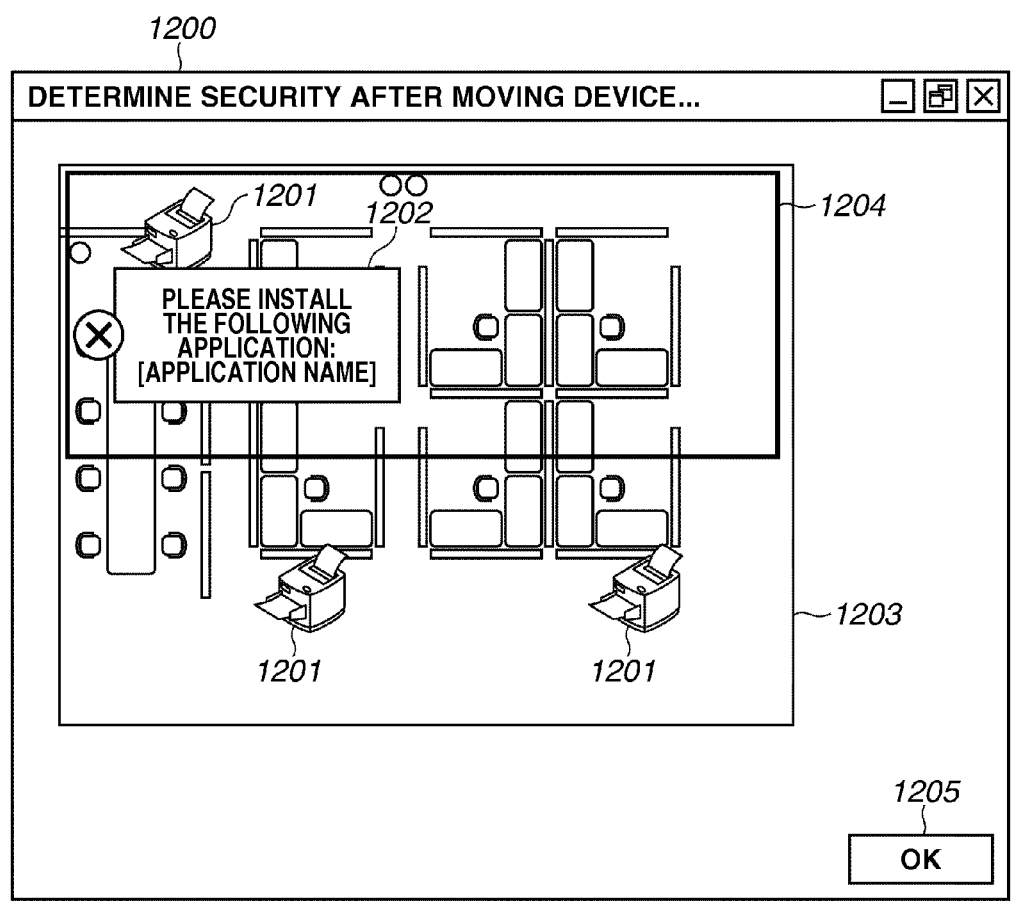
FIG. 9 illustrates an example UI for determining a security status when a network device has moved.

When the user instructs the start of determining the security of the network device via the web browser included in the client apparatus 103 which the user operates, the web server service 306 displays a security determination window 1200 illustrated in FIG. 9 on the web browser. The security determination window 1200 illustrated in FIG. 9 will be described in detail below.

FIG. 9 illustrates an example UI for determining the security status when the network device has been moved.

Referring to FIG. 9, the security determination window 1200 includes a network device icon 1201. By dragging on the network device icon 1201, the user (operator of the client apparatus 103) can move the network device 102 within a map area 1203. In the following description, the map area 1203 will also be referred to as a "device map 1203". The map area 1203 is drawn by the drawing module 302. Furthermore, the map area 1203 is substantially similar to the map area 1103 illustrated in FIG. 7.

When the user changes the positional information about the network device 102 by moving (dragging) an icon (hereinafter may be referred to as a "device icon") 1201 for the network device 102, which is drawn on the map area 1203, by using the mouse, the application management module 301 starts processing in steps S700 through S706 illustrated in FIG. 8.

A security warning popup 1202 is displayed if it is determined that the network device icon that has entered a security application range 1204 does not match the security rule.

In the security warning popup 1202, the name of an application required to be installed or uninstalled is displayed. In addition, the security application range 1204 is designated by the user by using the security application range selection tool 1101 illustrated in FIG. 7.

When the user presses an OK button 1205, the security determination window 1200 is closed. The user operation via the security determination window 1200 can be input by using the mouse connected to the I/O I/F 207 of the client apparatus 103, which the user operates.

Processing in each step of the flow chart of FIG. 8 will be described in detail below. Referring to FIG. 8, in step S700, the application management module 301 acquires an identification (ID) number of the network device 102. More specifically, the application management module 301 determines whether the user has clicked on a location corresponding to the device icon 1201, according to the position of clicking on the map area 1203 by the user.

If it is determined that the user has clicked on the device icon 1201, the application management module 301 acquires information (for example, the MAC address of the network device 102) for identifying the network device 102 corresponding to the clicked device icon 1201 from the database 304, which stores the information about the network device 102.

In step S701, the application management module 301 acquires the coordinates (the positional information about the network device 102 on the device map, which has been changed by the user) of the moving destination of the network device 102 designated by the user in step S700.

In step S702, the application management module 301 determines whether the network device 102 has moved to a region whose security rule is different from the security rule applied to the region before movement. In executing the determination in step S702, the application management module 301 acquires the security rules applied to the regions before and after the movement of the network device 102 by accessing the database 304. The application management module 301 executes the determination by comparing the acquired security rules.

If it is determined that the network device 102 has moved to a region whose security rule is the same as the security rule of the region before movement (NO in step S702), then the processing proceeds to step S706. On the other hand, if it is determined that the network device 102 has moved to a region whose security rule is different from the security rule of the region before movement (YES in step S702), then the processing proceeds to step S703.

In step S703, the application management module 301 determines whether the configuration information about the network device 102 matches the security rule applied to the movement target region (i.e., the application management module 301 determines whether the network device 102 complies with the security rule applied to the movement target region). More specifically, in executing the determination in step S703, the application management module 301 acquires the configuration information about the network device 102, which has been moved, by accessing the database 304. The application management module 301 executes the determination by comparing the acquired configuration information about the network device 102 and the security rule applied to the movement target region.

In addition, the application management module 301 executes the determination in step S703 by also using a content of the configuration of the network device 102 that has been changed, which is necessary for the network device 102. Alternatively, the configuration information about the network device 102 can be acquired directly from the network device 102 by using the network search module 307.

If it is determined that the acquired configuration information about the network device 102 matches the security rule applied to the movement target region (i.e., that the network device 102 complies with the security rule applied to the movement target region) (YES in step S703), then the processing proceeds to step S706.

On the other hand, if it is determined that the acquired configuration information about the network device 102 does not match the security rule applied to the movement target region (i.e., that the network device 102 does not comply with the security rule applied to the movement target region) (NO in step S703), then the processing proceeds to step S704.

The application management module 301 displays the security warning popup 1202 on the above-described web browser via the web server service 306. By displaying the security warning popup 1202 in this manner, the application management module 301 notifies the configuration change required to be applied to the network device 102 due to the movement, which is determined by the application management module 301, to the operator.

In step S704, the application management module 301 prompts the user to determine whether to cancel moving the network device 102. The application management module 301 receives a reply to the inquiry in step S704 from the user.

For example, the application management module 301 displays a message, such as "cancel moving of the apparatus?", and a popup window (not illustrated), which includes "Yes"

and "No" buttons via the web browser to receive a user instruction input by pressing the button.

If it is determined that the moving of the network device 102 is to be cancelled (i.e., that the user has pressed the "Yes" button") (YES in step S704), then the application management module 301 discards the coordinate information about the movement target region, and the processing of the flow chart of FIG. 8 ends.

In this case, the application management module 301 returns the device icon 1201 to its original position and closes the security warning popup 1202 via the web browser.

On the other hand, if it is determined that the moving of the network device 102 is not to be cancelled (i.e., that the "No" button has been pressed by the user) (NO in step S704), then the processing proceeds to step S705.

Figure 10:
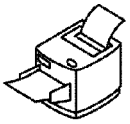
FIG. 10 illustrates an example network device configuration changing UI displayed in step S705 illustrated in FIGS. 11A and 11B.

In step S705, the application management module 301 displays a configuration change request transmission screen illustrated in FIG. 10, which is a screen for changing the configuration of the network device 102 according to the security rule applied to the movement target region, on the web browser. Then, the processing proceeds to step S706. By displaying the screen illustrated in FIG. 10 on the web browser, the application management module 301 can prompt the user to generate a task for requesting the change of the apparatus configuration, such as an application transmission task or a license returning task.

The user can input a parameter, such as the date and the time of actually transmitting the configuration change request, via the screen illustrated in FIG. 10. If the network device 102 is an MFP, because the network device 102 is continuously used during the daytime for business operations, it may be difficult for the network device management apparatus 101 to change the configuration of the network device 102.

In this case, alternatively, the user can input the date only and the network device management apparatus 101 can transmit a request for changing the configuration of the network device 102 at a predetermined time during the nighttime, for example. The display screen illustrated in FIG. 10 will be described in detail below.

FIG. 10 illustrates an example network device configuration changing UI, which is displayed in step S705 illustrated in FIG. 8.

Referring to FIG. 10, a network device configuration changing menu window 1300 includes a configuration change content display field 1301. The configuration change content display field 1301 displays the content of the configuration changing operation executed to the network device whose configuration is to be changed (i.e., what is to be changed for the configuration of the network device 102). By displaying the change content in the configuration change content display field 1301, the item to be changed in the configuration of the network device 102, which is required to be changed due to the movement of the network device 102, can be notified to the operator.

A configuration changing date input field 1302 and a configuration changing time input field 1303 are fields for receiving a user input (designation) of the date and the time of changing the configuration of the network device. When the user presses a "set" button 1304, the window 1300 is closed. Furthermore, in order to execute the designated configuration changing operation (i.e., the transmission of a request for changing the configuration of the network device 102) at the designated time of the designated date, a task is registered to the database 304.

In this case, the security warning popup 1202 is also closed. Subsequently, after reading the information included in the task from the database 304, the application management module 301 executes the task and performs a control for executing the designated configuration changing operation at the designated date and time. In the example illustrated in FIG. 10, the application management module 301 requests the network device 102 to execute the designated configuration changing operation (i.e., an operation for uninstalling an application A from a device X) at the designated time of the designated date (i.e., at 23:00, June 22).

If the window 1300 has been closed when the setting button 1304 has not been pressed by the user, the task for executing the designated configuration changing operation at the designated time of the designated date is not registered to the database 304. In addition, in this case, the display of the security warning popup 1202 is continued.

In actually moving the network device 102, the timing for moving the network device may be different according to the security rule. For example, if the network device is to be moved to a region to which the installation (or the uninstallation) of a specific application is required, it is necessary to execute the installation or the uninstallation before moving the network device.

On the other hand, if the network device is to be moved to another region from a region to which the installation (or the uninstallation) of a specific application is required, it is necessary to install or uninstall the application after moving the network device.

Accordingly, the application management module 301 executes control for displaying a configuration change caution message 1305, which describes caution information about the time for actually moving the network device. With the above-described configuration, the present exemplary embodiment can notify the operator that it is necessary to execute the change of the configuration of the network device 102 before or after actually moving the network device 102.

Returning to the flow chart of FIG. 8, in step S706, the application management module 301 stores the coordinates of the network device in the movement target region. Accordingly, the application management module 301 finally determines that the network device has been moved. Then the processing ends.

As described above, in the present exemplary embodiment, the windows 1200 and 1300 are displayed on the web browser of the client apparatus 103 currently operated by the user. In addition, the user inputs the security rule via the web browser. However, alternatively, the windows 1200 and 1300 can be displayed on a display of the network device management apparatus 101. In this case, the user can input the security rule by using the mouse of the network device management apparatus 101.

With the above-described configuration, the administrator can easily verify whether the configuration information about the network device matches the security policy applied to the movement target region by merely moving the icon for the apparatus into the security application region on the screen of the management apparatus. In addition, even if the configuration information about the network device does not match the security policy applied to the movement target region, the administrator can easily recognize what configuration change is required.

In addition, the security application region can be schematically displayed on the management apparatus. Accordingly, the present exemplary embodiment having the above-described configuration can allow the administrator to easily manage the security application region because the administrator is not required to memorize the security application region.

Furthermore, according to the present exemplary embodiment having above-described configuration, if the application is to be installed to the network device 102 or uninstalled from the network device 102, even if the installation or the uninstallation of the application cannot be executed immediately, the present exemplary embodiment can semiautomatically control the timing for executing the necessary installation or uninstallation.

In addition, with the above-described configuration, the present exemplary embodiment can allow the user to set the restriction of utilization of the network device 102 before moving the network device 102 by controlling the timing of actually installing or uninstalling the application.

In the first exemplary embodiment described above, if the network device 102 has been moved and if the network device 102 is not compliant with the security rule applied to the movement target region, the network device management apparatus 101 changes the configuration of the network device 102.

However, the network device 102 may not always be moved immediately before or after the timing of changing the configuration of the network device 102 as scheduled. In addition, the difference between the timing of moving the network device 102 and the timing of changing the configuration of the network device 102 may become significant in some cases.

For example, if the network device 102 is to be moved to a region to which a stricter security rule has been applied, it is required to change the configuration of the network device 102 before completely moving the network device 102. On the other hand, if the network device 102 is to be moved to a region to which a reduced security rule has been applied, it is required not to change the configuration of the network device 102 unless the network device 102 is completely moved.

In the present exemplary embodiment, the difference between the timing of moving the network device 102 and the timing of changing the configuration of the network device 102 is controlled. The processing in steps S600 through S603 and steps S700 through S702 is the same as that in the first exemplary embodiment described above. Accordingly, the detailed description thereof will not be repeated here. In the present exemplary embodiment, after executing the processing in steps S700 and S701 illustrated in FIG. 8, the following processing in the flow charts of FIGS. 11A and 11B are executed.

Figure 11A:
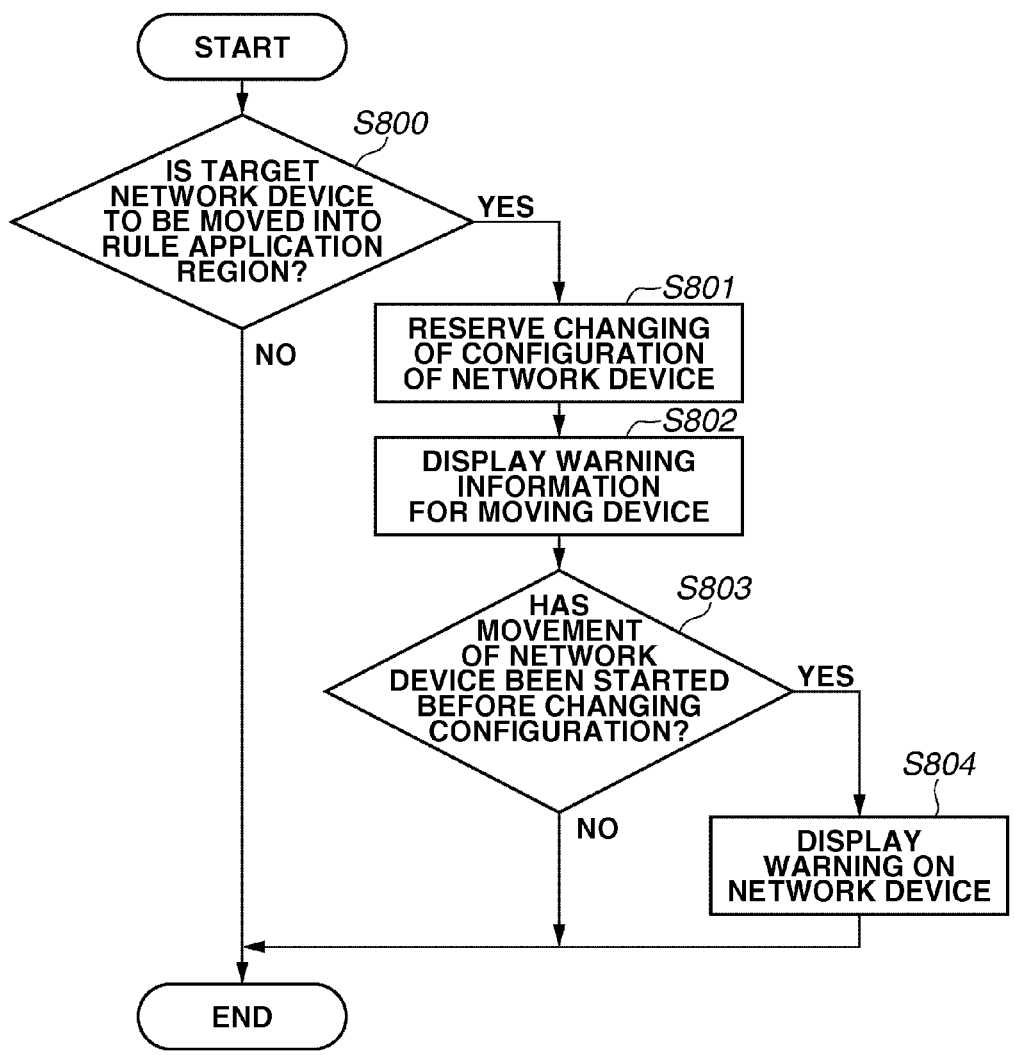
FIGS. 11A and 11B are flow charts illustrating an example flow of processing for installing and uninstalling an application when a target network device 102 is moved.
Figure 11B:
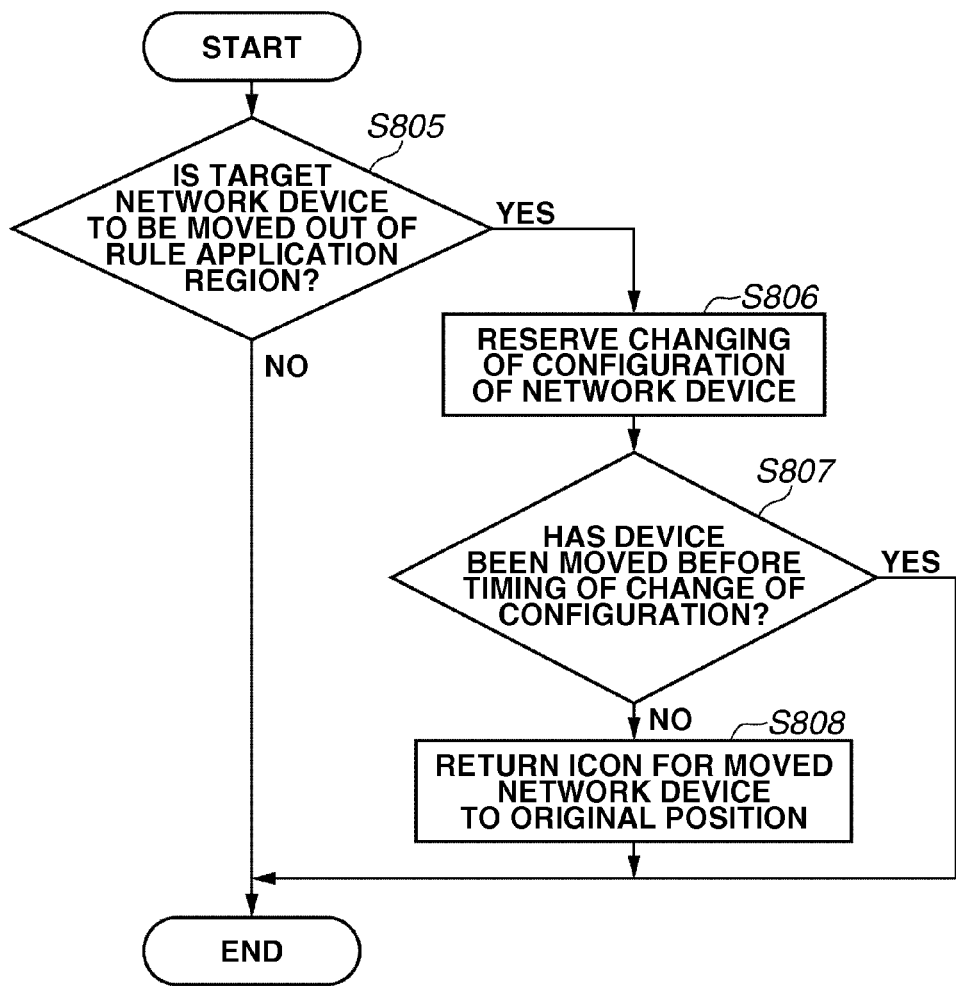

FIGS. 11A and 11B are flow charts illustrating an example flow of processing for installing and uninstalling an application when the target network device 102 is to be moved. The processing illustrated in the flow charts of FIGS. 11A and 11B are executed mainly by the application management module 301 of the network device management apparatus 101.

After executing the processing in steps S700 and S701 illustrated in FIG. 8, the application management module 301 executes the processing illustrated in FIGS. 11A and 11B.

Referring to FIG. 11A, in step S800, the application management module 301 acquires information from the security rule management module 303 and determines whether the network device 102 to be moved is to be moved to a security rule application region.

If it is determined that the network device 102 is not to be moved to a security rule application region (NO in step S800), then the processing illustrated in FIG. 11A ends.

On the other hand, if it is determined that the network device 102 is to be moved to a security rule application region (YES in step S800), then the processing proceeds to step S801.

In step S801, the application management module 301 registers a reservation for executing a task that requests the execution of the change of the configuration of the network device 102 (for example, an application transmission task) at the designated time to the database 304. Then the processing proceeds to step S802.

The above-described time can be designated by the user via the UI illustrated in FIG. 10, which is displayed in step S705 (FIG. 8). Alternatively, the above-described time can be automatically selected by the application management module 301 considering the time in which the network device 102 is not very frequently utilized.

If the configuration information about the network device 102 to be moved matches the security rule applied to the movement target region (i.e., if the network device 102 is compliant with the security rule of the movement target region), then the processing illustrated in FIG. 11A ends. In addition, if the user has cancelled the moving of the network device 102, then the processing illustrated in FIG. 11A ends.

In step S802, the application management module 301 requests the drawing module 302 to display a screen for warning the user not to move the network device 102 before the time of change of the configuration of the network device 102.

The screen is displayed on the web browser of the client apparatus 103, which is currently operated by the user via the web server service 306.

When the configuration change reservation time registered in step S801 comes, the application management module 301 transmits a configuration change request to the network device 102 in step not illustrated in FIG. 11 (i.e., the application management module 301 executes the task generated in step S801).

Before issuing the request for changing the configuration, in step S803, the application management module 301 determines whether the moving of the network device 102 has been started before the configuration change request is transmitted to the network device 102. The start of moving of the network device 102 is detected by the movement detection module 504, which is included in the network device 102.

If the network device 102 includes a position detection device, such as a global positioning system (GPS), the moving of the network device 102 can be detected by using the position detection device. On the other hand, if the network device 102 does not include any position detection device like this, the moving of the network device 102 can be input by the user by pressing a specific button on the operation unit 401 at the start and the end of the moving of the network device 102.

If it is determined that the moving of the network device 102 has been started before transmitting a configuration change request to the network device 102 (YES in step S803), then the processing proceeds to step S804.

In step S804, the application management module 301 displays a warning message on a screen of the operation unit 401 of the network device 102, which warns the user not to move the network device. Then the processing illustrated in FIG. 11A ends.

The method for displaying the warning message on the screen of the network device 102 will not be described in detail here. However, to briefly describe the warning message display method, in the network device 102, the message can be displayed by writing a text string onto a specific management information base (MIB) by using the simple network management protocol (SNMP). If the user has cancelled moving the network device 102 after recognizing the warning message, the processing may return to step S803.

On the other hand, if the network device 102 is moved to a security rule application region even when the warning message is presented to the user, the application management module 301 issues a configuration change request when the configuration change reservation time set in step S801 comes (i.e., the application management module 301 executes the task generated in step S801). In addition, the application management module 301 registers the positional information about the movement target region of moving the network device 102 to the database 304.

On the other hand, if no moving of the network device 102 has been detected, when the configuration change reservation time set in step S801 has come, and if the configuration change request (the task generated in step S801) is issued, the application management module 301 executes control for ending the processing illustrated in FIG. 11A. In this case, the positional information about the movement target region of moving the network device 102 is registered to the database 304.

As described above, if the moving of the network device 102 is started before the transmission of the configuration change request, the application management module 301 executes control for transmitting the configuration change request for changing the configuration of the network device 102 even when the warning message is displayed.

Processing illustrated in the flow chart of FIG. 11B will be described in detail below. Referring to FIG. 11B, in step S805, the application management module 301 acquires information from the security rule management module 303 and determines whether the network device 102 is to be moved out of the security rule application region.

If it is determined that the network device 102 is not to be moved out of the security rule application region (NO in step S805), then the processing illustrated in FIG. 11B ends.

On the other hand, if it is determined that the network device 102 is to be moved out of the security rule application region (YES in step S805), then the processing proceeds to step S806.

In step S806, similar to the processing in step S801 (FIG. 11A), the application management module 301 registers a reservation for executing a task that requests the execution of the change of the configuration of the network device 102 (for example, a license return task) at the designated time to the database 304. Then the processing proceeds to step S807.

If the network device 102 is moved out of the security rule application region, it is not basically necessary to change the configuration. Accordingly, the processing in step S806 and subsequent steps is to be executed if the uninstallation of the application from the network device 102 is necessary in terms of the number of effective licenses.

In addition, the designation of the above-described time can be input by the user, and the application management module 301 can acquire the user-designated time similarly to the processing in step S801. Alternatively, the above-described time can be automatically selected by the application management module 301 considering the time in which the network device 102 is not very frequently utilized.

When the configuration change reservation time registered in step S806 has come, the application management module 301 transmits a configuration change request to the network device 102 in a step not illustrated.

Furthermore, in step S807, the application management module 301 determines whether the network device 102 has been already moved when the configuration change request transmission time (the task execution time) comes.

If it is determined that the network device 102 has been already moved when the configuration change request trans-mission time comes (YES in step S807), then the application management module 301 executes control for ending the processing illustrated in FIG. 11B. In this case, the task generated in step S806 is executed as scheduled. Furthermore, the application management module 301 registers the positional information about the movement target region of moving the network device 102 to the database 304.

On the other hand, if it is determined that the network device 102 has not been already moved when the configuration change request transmission time comes (NO in step S807), then the processing proceeds to step S808.

In step S808, the application management module 301 cancels the reservation of moving the network device 102 and the configuration change processing (i.e., the task generated in step S806) executed in step S806, and returns the moved network device icon to its original position. Then the processing illustrated in FIG. 11B ends.

In other words, if the network device 102 has not been moved yet at the timing of transmission of the configuration change request, the application management module 301 executes control not for requesting and transmitting the configuration change request. This is because if the network device 102 is to be moved out of the region to which a strict security rule is applied, it is inhibited to change the configuration of the network device 102 before completely moving the network device 102. In this case, the positional information about the movement target region of moving the network device 102 is not registered to the database 304.

Alternatively, the application management module 301 can request the drawing module 302 to display a screen for prompting the user to move the network device 102 before the timing of changing the configuration of the network device 102.

With the above-described configuration, the present exemplary embodiment can control the difference between the timing of moving the network device 102 and the timing of changing the configuration of the network device 102.

For example, if the network device 102 is to be moved to a region to which a strict security rule has been applied, it may become necessary to change the configuration before completely moving the network device 102. In this case, if the moving of the network device 102 has been started before changing the configuration of the network device 102, the application management module 301 executes control for displaying the warning message on the operation unit 401 of the network device 102 to prompt the user to change the configuration of the network device 102 before moving the network device 102.

Accordingly, the present exemplary embodiment having the above-described configuration can prevent changing of the configuration of the network device 102 before the network device 102 is completely moved.

In the present exemplary embodiment, as described above, if the positional information about the network device 102 after the network device 102 is moved indicates that the network device 102 has been moved from any region other than the security rule application range into the security rule application range (i.e., if the positional information about the network device 102 has been changed from the position in the other region to a position within the security rule application range), the application management module 301 determines that it is necessary to change the configuration of the network device 102 before actually moving the network device 102.

On the other hand, if the network device 102 is to be moved to a region to which a reduced security rule has been applied, it may become necessary to wait the change of the configuration of the network device 102 until the network device 102 is completely moved. In this case, if the network device 102 has not been moved yet at the timing of change of the configuration of the network device 102, the application management module 301 executes control for cancelling the change of the configuration of the network device 102 (suspending the change of the configuration (the execution of the task)). Accordingly, the present exemplary embodiment having the above-described configuration can securely prevent changing of the configuration of the network device 102 before completely moving the network device 102.

In the present exemplary embodiment, as described above, if the positional information about the network device 102 indicates that the network device 102 has been moved from a specific security rule application range to any other region (i.e., if the positional information about the network device 102 has been changed to information about a position in the specific security rule application range to a position in any other region), the application management module 301 determines that it is necessary to change the configuration of the network device 102 after actually moving the network device 102.

If a security application region is newly provided in the region in which the network device 102 has already been installed, the application management module 301 can execute the processing in step S801 of FIG. 11A determining that the network device 102 that has already been installed in the region has been moved to the region.

On the other hand, if the already-set security rule application region has been deleted, the application management module 301 can execute the processing in step S806 of FIG. 11B determining that the network device 102 that has already been installed to the region has been moved out of the region.

In the present exemplary embodiment, the network device management apparatus 101 transmits to the network device 102, at the designated time, a configuration change request for changing the configuration of the network device 102. However, alternatively, the network device management apparatus 101 can transmit a request for changing the configuration of the network device 102 at the designated time to the network device 102.

In this case, the processing in steps S803 and S804 of FIG. 11A and the processing in step S807 of FIG. 11B are executed by the network device 102. However, it is supposed in this case that the above-described request is a request for changing the configuration of the network device 102 under a condition, such as a condition for executing a warning if the network device 102 is to be moved at the timing of change of the configuration or before the configuration is changed or a condition for cancelling the change of the configuration if the network device 102 is to be actually moved before changing the configuration of the network device 102.

In addition, after the configuration is completely changed, the network device 102 transmits a notification indicating that the configuration has been completely changed to the network device management apparatus 101.

If the change of the configuration of the network device 102 has failed or if the change of the configuration of the network device 102 is cancelled because the network device 102 has not been moved yet at the timing of change of the configuration (YES in step S807 of FIG. 11B), then the network device 102 transmits a notification indicating that the configuration of the network device 102 has not been changed to the network device management apparatus 101. When the notification is received, the application management module 301 executes control for returning the icon for the moved network device to its original position.

In each of the above-described first and the second exemplary embodiments, information about whether an application has been installed to the network device 102 is used as the security rule to be applied to a region. However, the rule the network device 102 should comply with includes a rule that to whom (the user) the operation of the network device 102 is permitted for which region. Accordingly, in a third exemplary embodiment of the present invention, a method for managing a setting for permitting the utilization of the network device 102 will be described.

Figure 12:
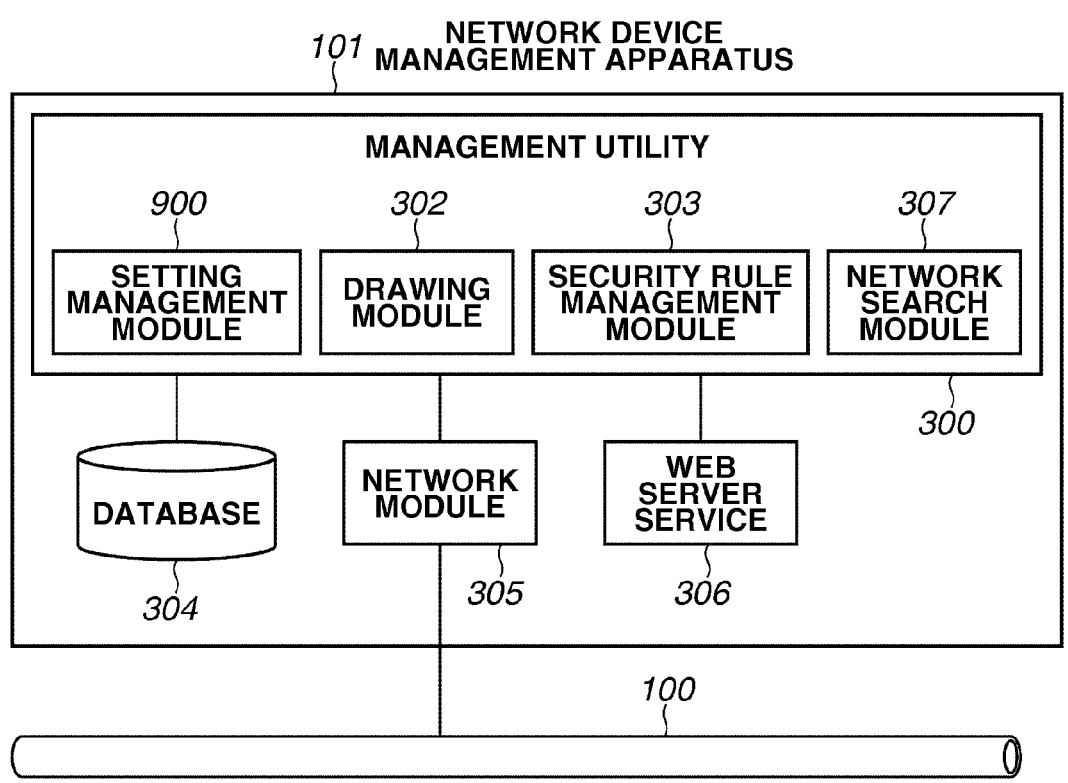
FIG. 12 is a block diagram illustrating an example software configuration of a network device management apparatus 101 according to a third exemplary embodiment of the present invention.

FIG. 12 is a block diagram illustrating an example software configuration of the network device management apparatus 101 according to the present exemplary embodiment. The components of the network device management apparatus 101 similar to those of the network device management apparatus 101 illustrated in FIG. 3 are provided with the same reference numerals and symbols. In addition, the software configuration illustrated in FIG. 12 is stored on the HD 205 (FIG. 2) as a program, and is executed by the CPU 201 (FIG. 2).

Referring to FIG. 12, a setting management module 900 is configured to manage a setting of the network device 102. The setting management module 900 includes a function for requesting the network module 305 to transmit to the network device 102 information for identifying an operator (a user) who can utilize the network device 102. Furthermore, the application management module 301 registers the information for identifying the user who can utilize the network device 102 to the database 304.

The security rule management module 303 according to the present exemplary embodiment operates to execute a setting of a user who can utilize the network device 102 or a user who cannot utilize the network device 102 via the UI illustrated in FIG. 7 as a security policy rule (i.e., a rule that the network device should comply with).

Figure 13:
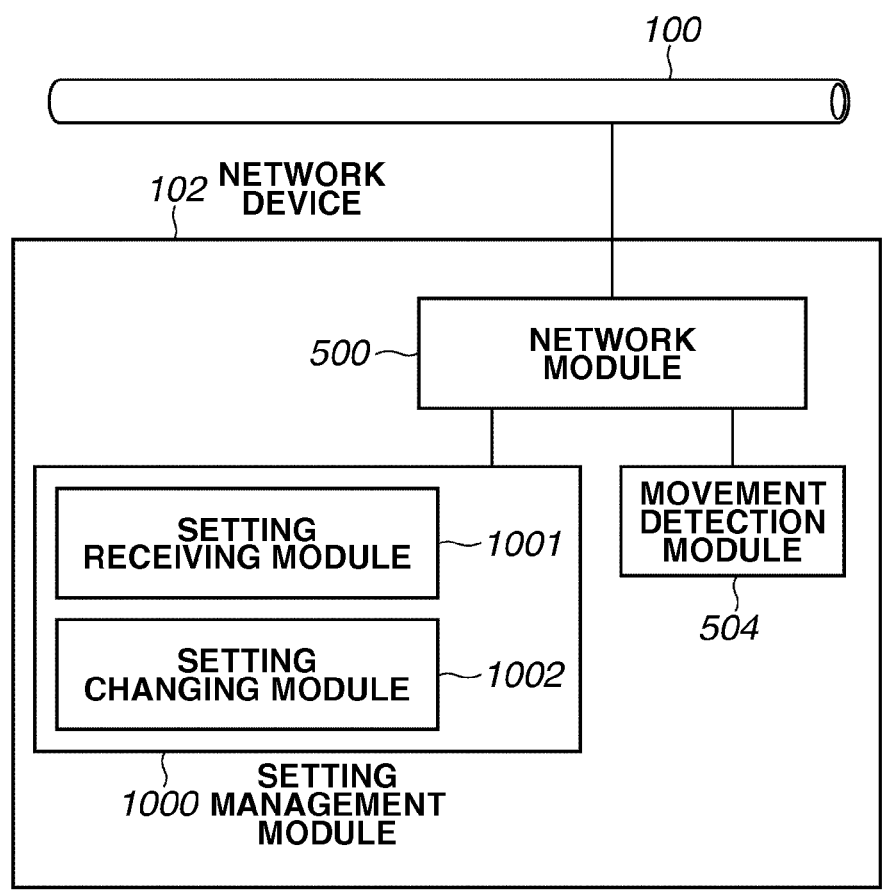
FIG. 13 is a block diagram illustrating an example software configuration of a network device 102 according to the third exemplary embodiment of the present invention.

FIG. 13 is a block diagram illustrating an example software configuration of the network device 102 according to the present exemplary embodiment. The components of the network device 102 similar to those of the network device 102 illustrated in FIG. 5 are provided with the same reference numerals and symbols. In addition, the software configuration illustrated in FIG. 13 is stored on the ROM 414 or the HD 416 illustrated in FIG. 4 as a program, and is executed by the CPU 410 (FIG. 4).

Referring to FIG. 13, a setting management module 1000 includes a function for controlling who (the user) can utilize the network device 102. The setting management module 1000 includes a setting receiving module 1001 and a setting changing module 1002.

The setting receiving module 1001 is configured to receive information for identifying a user who can utilize the network device 102, which has been transmitted from the network device management apparatus 101. In addition, the setting receiving module 1001 is configured to request the setting changing module 1002 to set the user who can utilize the network device 102.

The setting changing module 1002 is configured to add and delete the information about the user who can utilize the network device 102 according to information received from an external apparatus.

Alternatively, the setting management module 900 illustrated in FIG. 12 may include the function of the application management module 301 in FIG. 3, and the setting management module 1000 may include the function of the application management module 501 in FIG. 5. To paraphrase this, in this case, the setting receiving module 1001 can include the function of the application receiving module 502 in FIG. 5, and the setting changing module 1002 can include the function of the application addition/deletion module 503 in FIG. 5.

If the above-described configuration is employed, the security rule management module 303 according to the present exemplary embodiment operates to set both application installation status information and the information about the user who can utilize the network device 102 related to one network device via the UI illustrated in FIG. 7 as the security policy rule (i.e., a rule that the network device 102 should comply with).

In the present exemplary embodiment, the security rule management module 303 executes the operation similar to that in the first exemplary embodiment described above with reference to FIG. 6. In addition, in the present exemplary embodiment, processing for determining whether the security rule is complied with, which is described above with reference to FIG. 8, is similar to the processing executed by the first exemplary embodiment except that the processing is executed by the setting management module 900 instead of the application management module 301. Accordingly, the detailed description thereof will not be repeated here.

With the above-described configuration, the present exemplary embodiment can allow the administrator to recognize that the setting of the user who can utilize the network device 102, which complies with the security policy applied to the movement target region, as the setting necessary to be executed when the network device 102 is moved by merely moving the icon for the network device 102 to the security application region on the screen of the management apparatus. In addition, the present exemplary embodiment having the above-described configuration can semiautomatically execute the setting of the user who can utilize the network device 102.

In addition, if it is desired by the administrator to execute a restriction on the use of the network device 102 before moving the network device 102, the administrator is allowed to execute the restriction by controlling the timing of setting the user who can utilize the network device 102.

In each exemplary embodiment described above, the configuration of the network device 102 to be changed due to the moving of the network device 102 is notified from the network device management apparatus 101 to the user. In addition, the network device management apparatus 101 requests the network device 102 to change the configuration of the network device 102 at the designated time.

However, the network device management apparatus 101 may notify the user of the change of the configuration of the network device 102 executed when the network device 102 is moved, and the user may actually change the configuration of the network device 102 by operating the network device management apparatus 101.

In each exemplary embodiment described above, an MFP, a printer, or a facsimile apparatus is used as the network device 102. However, a general information processing apparatus, such as a PC, can be used as the network device 102.

The structures of various data described above and the content of the data are not limited to those described above. In other words, various data described above can include various structures or contents according to its use or the purpose of use.

The exemplary embodiments of the present invention are as described above. The present invention can be implemented in a system, an apparatus, a method, a program, or a storage medium storing the program, for example. More specifically, the present invention can be applied to a system including a plurality of devices and to an apparatus that includes one device.

In addition, all configurations of any combinations of the above-described exemplary embodiments of the present invention are included in the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-233684 filed Oct. 18, 2010, which is hereby incorporated by reference herein in its entirety.

What is claimed is:

1. An apparatus configured to manage a network device, the apparatus comprising:
 a storage device configured to store a map image of one or more floors on which the network device is installed, positional information about an installation location of the network device on the map image, and configuration information about the network device;
 a setting unit configured to set a region on the map image and a rule that the network device complies with in the region;
 a moving unit configured to designate a movement destination for moving the network device by changing the positional information;
 a determination unit configured, if the positional information has been changed, to determine a content of a change of a configuration required to be executed to the network device when the network device is moved, by comparing the configuration information about the network device whose positional information has been changed and the rule in which the changed positional information belongs; and
 a notification unit configured to notify to an operator the content of the change of the configuration,
 wherein the determination unit is configured, if the positional information has been changed from information about a position in a region other than a specific region to information about a position in the specific region to which the rule has been set, to determine that it is necessary to execute the change of the configuration before moving the network device, and
 wherein a notification by the notification unit indicates that it is necessary to execute the change of the configuration before moving the network device.

2. The apparatus according to claim 1, further comprising:
 a drawing unit configured to perform a drawing process to display the map image, on which an icon indicating the installation location of the network device is provided, by using the map image and the positional information,
 wherein the setting unit is configured to set the region by designating a range on the map image via the display screen, and
 wherein the moving unit is configured to designate the moving destination by moving the icon via the display screen on the map image.

3. The apparatus according to claim 1,
 wherein the notification by the notification unit further indicates that it is necessary to execute the change of the configuration after moving the network device, and
 wherein the determination unit is configured, if the positional information has been changed from information about a position in the specific region to which the rule is applied to information about a position in the other region, to determine that it is necessary to execute the change of the configuration after moving the network device.

4. The apparatus according to claim 1, further comprising a configuration changing unit configured to transmit a configuration change request for requesting a configuration change to the network device.

5. The apparatus according to claim 4, further comprising a designation unit configured to prompt a user to designate a date and time for transmitting the configuration change request, wherein the configuration changing unit is configured to transmit the configuration change request at the designated date and time.

6. The apparatus according to claim 4, further comprising a designation unit configured to prompt the user to designate a date for transmitting the configuration change request, wherein the configuration changing unit is configured to transmit the configuration change request at predetermined designated time of the date.

7. The apparatus according to claim 1,
wherein the rule includes a designation of an application program required to be installed to or uninstalled from the network device, and
wherein the change of the configuration includes a change of the configuration of the application program installed in the network device.

8. The apparatus according to claim 1,
wherein the rule includes a designation of a user to be set as a user who can or cannot utilize the network device, and
wherein the change of the configuration includes a change of the user who can utilize the network device set to the network device.

9. A method for managing one or more network devices, the method comprising:
storing, on a storage device, a map image of one or more floors on which the network device is installed, positional information about an installation location of the network device on the map image, and configuration information about the network device;
setting a region on the map image and a rule that the network device complies with in the region;
designating a movement destination for moving the network device by changing the positional information;
determining, if the positional information has been changed, a content of a change of a configuration required to be executed to the network device when the network device is moved, by comparing the configuration information about the network device whose positional information has been changed and a rule in which the changed positional information belongs;
notifying, to an operator, the content of the change of the configuration; and
determining, if the positional information has been changed from information about a position in a region other than a specific region to information about a position in the specific region to which the rule has been set, that it is necessary to execute the change of the configuration before moving the network device,
wherein a notification by the notifying indicates that it is necessary to execute the change of the configuration before moving the network device.

10. The method according to claim 9, further comprising:
performing a drawing process to display the map image, on which an icon indicating the installation location of the network device is provided, by using the map image and the positional information,
wherein the setting the region includes designating a range on the map image via the display screen, and
wherein designating the moving destination includes moving the icon via the display screen on the map image.

11. The method according to claim 9, further comprising transmitting a configuration change request for requesting a configuration change to the network device.

12. The method according to claim 9,
wherein the rule includes a designation of an application program required to be installed to or uninstalled from the network device, and
wherein the change of the configuration includes a change of the configuration of the application program installed in the network device.

13. A non-transitory computer-readable storage medium storing instructions which, when executed by a computer configured to execute a method for managing a network device, causes the computer to perform operations comprising:
storing, on a storage device, a map image of one or more floors on which the network device is installed, positional information about an installation location of the network device on the map image, and configuration information about the network device;
setting a region on the map image and a rule that the network device complies with in the region;
designating a movement destination for moving the network device by changing the positional information;
determining, if the positional information has been changed, a content of a change of a configuration required to be executed to the network device when the network device is moved, by comparing the configuration information about the network device whose positional information has been changed and the rule in which the changed positional information belongs;
notifying, to an operator, the content of the change of the configuration; and
determining, if the positional information has been changed from information about a position in a region other than a specific region to information about a position in the specific region to which the rule has been set, that it is necessary to execute the change of the configuration before moving the network device,
wherein a notification by the notifying indicates that it is necessary to execute the change of the configuration before moving the network device.

14. The non-transitory storage medium according to claim 13, further comprising:
performing a drawing process to display the map image, on which an icon indicating the installation location of the network device is provided, by using the map image and the positional information,
wherein the setting the region includes designating a range on the map image via the display screen, and
wherein designating the moving destination includes moving the icon via the display screen on the map image.

15. The non-transitory storage medium according to claim 13, further comprising transmitting a configuration change request for requesting a configuration change to the network device.

16. The non-transitory storage medium according to claim 13,
wherein the rule includes a designation of an application program required to be installed to or uninstalled from the network device, and wherein the change of the configuration includes a change of the configuration of the application program installed in the network device.

\* \* \* \* \*